(12) United States Patent
Cho et al.

(10) Patent No.: US 10,160,500 B2
(45) Date of Patent: Dec. 25, 2018

(54) VEHICLE ROOF

(71) Applicants: Hyundai Motor Company, Seoul (KR); Kia Motors Corporation, Seoul (KR)

(72) Inventors: Sung Hoon Cho, Bucheon-si (KR); Hyungsub Lim, Daejeon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/661,992

(22) Filed: Jul. 27, 2017

(65) Prior Publication Data

US 2018/0244314 A1    Aug. 30, 2018

(30) Foreign Application Priority Data

Feb. 28, 2017 (KR) .......... 10-2017-0026633

(51) Int. Cl.
*B62D 25/06* (2006.01)
*B62D 29/04* (2006.01)
(52) U.S. Cl.
CPC .......... *B62D 25/06* (2013.01); *B62D 29/043* (2013.01)

(58) Field of Classification Search
CPC ............... B62D 25/06; B62D 29/043
USPC ........................................... 296/210
See application file for complete search history.

(56) References Cited

U.S. PATENT DOCUMENTS

| 4,052,523 A * | 10/1977 | Rhodes | B32B 3/12 |
| | | | 428/116 |
| 9,016,775 B2 * | 4/2015 | Gneiting | B62D 29/043 |
| | | | 296/193.06 |
| 2014/0028057 A1 * | 1/2014 | Nishimura | B62D 25/04 |
| | | | 296/193.06 |

FOREIGN PATENT DOCUMENTS

GB        2521937    *  7/2015

* cited by examiner

*Primary Examiner* — Dennis H Pedder
(74) *Attorney, Agent, or Firm* — Morgan, Lewis & Bockius LLP

(57) ABSTRACT

A vehicle roof includes a roof panel part made of a Carbon Fiber Reinforced Plastics (CFRP) material; and a plurality of center roof rail parts made of the CFRP material and bonded to the roof panel part to each other in a diagonal direction, thereby reducing a weight and increasing a stiffness of the vehicle roof.

6 Claims, 4 Drawing Sheets

VEHICLE ROOF

CROSS-REFERENCE(S) TO RELATED APPLICATIONS

The present application claims priority to Korean Patent Application No. 10-2017-0026633 filed on Feb. 28, 2017, the entire contents of which are incorporated herein for all purposes by this reference.

BACKGROUND OF THE INVENTION

Field of the Invention

The present invention relates to a vehicle roof. More particularly, the present invention relates to a vehicle roof manufactured of a Carbon Fiber Reinforced Plastics (CFRP) material.

Description of Related Art

In general, a roof of a vehicle constitutes an upper portion of a vehicle compartment, is disposed in a longitudinal direction of the vehicle, and is connected to a plurality of pillars extending in a height direction of the vehicle to be supported.

Also, the vehicle roof generally includes a roof panel of a quadrangle shape and at least one roof rail coupled to the roof panel thereby reinforcing a stiffness of the roof panel.

For example, a front roof rail and a rear roof rail are disposed and coupled before and after a roof panel in the length direction of the vehicle, and four or more center roof rails are disposed between the front roof rail and the rear roof rail to be coupled to the roof panel.

Since the roof panel and the plurality of roof rails are respectively manufactured of a steel material and coupled to each other by welding, the number of parts is large, a weight is excessive, and the number of welding operations is excessive.

Also, the plurality of roof rails is disposed with a predetermined interval along the length direction of the vehicle in an extending state along the width direction while being coupled to the roof panel thereby reinforcing a stiffness of the roof panel; however, there is an disadvantage for insufficient reinforcement of the stiffness of the roof panel due to the arrangement structure of the roof rail.

In addition to the above case, since the roof panel and numerous roof rails include steel material, there is also a disadvantage in a vehicle weight reduction and an enhancement of a fuel consumption.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a vehicle roof utilizing a low weight and increased structural stiffness with an optimized arrangement of a roof rail part on a roof panel part by integrally molding the roof panel part and the roof rail part by use of a Carbon Fiber Reinforced Plastics (CFRP) material.

A vehicle roof according to an exemplary embodiment of the present invention includes a roof panel part including a CFRP material; and a plurality of center roof rail parts including the CFRP material and bonded to the roof panel part to each other in a diagonal direction.

A front roof rail part and a rear roof rail part may be additionally formed at a front edge portion and a rear edge portion of the roof panel part.

A form core may be built-in to the front roof rail part and the rear roof rail part.

The plurality of center roof rail parts may be disposed to be crossed to each other.

The plurality of center roof rail parts may be bonded to a lower surface of the roof panel part.

The plurality of center roof rail parts may include a first center roof rail part connecting a front a side corner part of the roof panel part and a rear other side corner part; and a second center roof rail part connecting a front other side corner part of the roof panel part and a rear a side corner part.

The roof panel part may include a front side and a rear side adjacent to a window opening, and a left side and a right side adjacent to a front pillar and a rear pillar; and the front side and the rear side may be divided into five parts so that the plurality of center roof rail parts may be connected: and the left side and the right side may be divided into three parts so that the plurality of center roof rail parts may be connected.

An interval between four split points dividing the front side and the rear side into five parts may be the same.

The front side and the rear side may include a first, second, third and fourth split points for being divided into five parts; the left side and the right side may include a first split point and a second split point for being divided into three parts; the first split points of the left side and the right side may be disposed to overlap the rear pillar; and the second split point of the left side and right side may be disposed at a position dividing the interval between the first split point and a corner part of the roof panel part into two equal parts.

The plurality of center roof rail parts may include a third center roof rail part connecting the first split point of the front side and the first split point of the right side; a fourth center roof rail part connecting the second split point of the front side and the second split point of the right side; a fifth center roof rail part connecting the third split point of the front side and the second split point of the left side; a sixth center roof rail part connecting the first split point of the left side and the fourth split point of the front side; a seventh center roof rail part connecting the first split point of the rear side and the second split point of the right side; an eight center roof rail part connecting the second split point of the rear side and the first split point of the right side; a ninth center roof rail part connecting the third split point of the rear side and the second split point of the left side; and a tenth center roof rail part connecting the first split point of the left side and the third split point of the rear side.

According to the vehicle roof according to an exemplary embodiment of the present invention, the roof panel part and the plurality of roof rail parts are integrally formed of the CFRP material wherein the weight of the roof may be effectively reduced.

When disposing the plurality of roof rail parts to the roof panel part, the roof rail part is disposed at a load input portion of the roof panel part to which a load is input externally. The greater number of the roof rail parts which are disposed at the edge portion of the roof panel part adjacent to the windshield opening and positioned under the front side of the roof panel part along with the relatively small number of the roof rail parts which are disposed at the edge portion of the roof panel part adjacent to the door opening and under the side of the roof panel part, optimize the stiffness reinforce effect and may be obtained through the limited number of the roof rail part with the appropriately reinforce through the roof rail part depending on the connection stiffness that the roof panel part is connected to the surrounding vehicle body.

As each of the plurality of roof rail parts connects a width direction edge portion and a longitudinal direction edge portion of the roof panel part to each other, each of the roof rail parts is disposed to be crossed to each other to form a lattice pattern or a net shape, wherein the structural stiffness of the roof panel part may not only effectively increase, but also an external load input through the roof panel part may be effectively dispersed.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
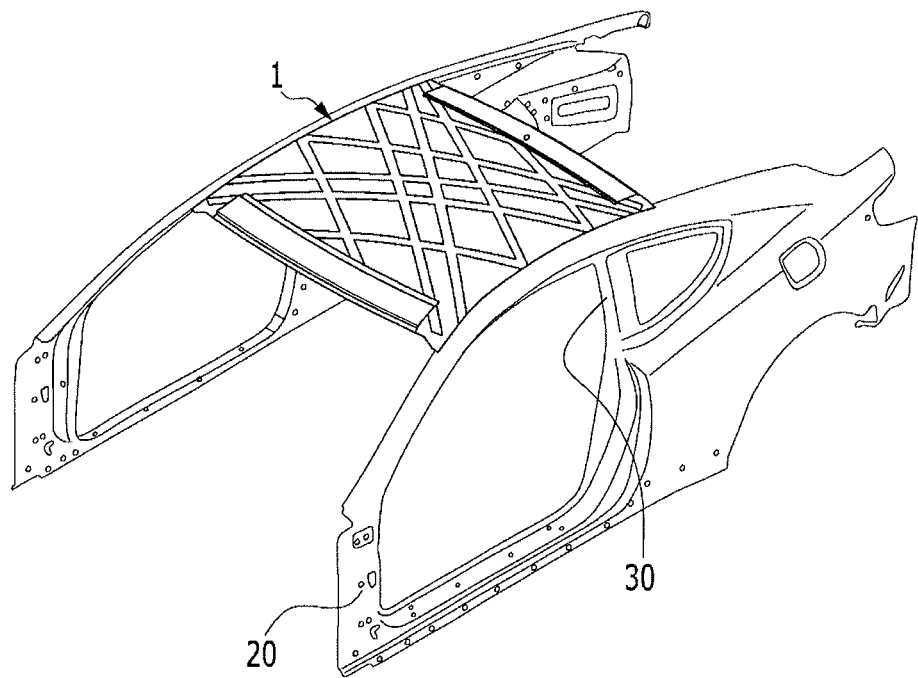
FIG. 1 is a perspective view showing a vehicle roof ccoupled to a surrounding vehicle body according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

Referring to FIG. 1, a vehicle roof 1 according to an exemplary embodiment of the present invention is made of a Carbon Fiber Reinforced Plastics (CFRP) material and may be coupled to a surrounding vehicle body to form an upper portion of the vehicle body.

That is, the vehicle roof 1 may be coupled to and supported by both a front pillar member 20 positioned at a front along a longitudinal direction of the vehicle and formed to extend upward along a height direction of the vehicle and a rear pillar member 30 positioned at a front along the longitudinal direction of the vehicle and formed to extend upward along the height direction of the vehicle.

Figure 2:
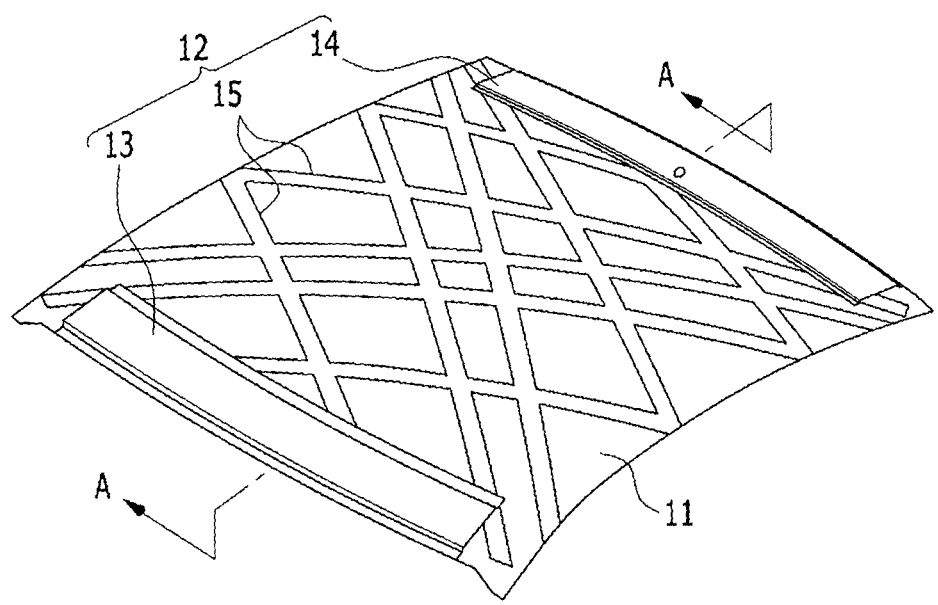
FIG. 2 is a perspective view of a vehicle roof according to an exemplary embodiment of the present invention.

Referring to FIG. 2, the vehicle roof 1 may include a roof panel part 11 and a plurality of roof rail parts 12.

The roof panel part 11 may be formed in the shape of a substantially square panel and may include the CFRP material.

The plurality of roof rail parts 12 may respectively include a front roof rail part 13 positioned at a front edge portion of the roof panel part 11 along the longitudinal direction of the vehicle, a rear roof rail part 14 positioned at a rear, and a plurality of center roof rail parts 15 disposed in a diagonal direction between the front roof rail part 13 and the rear roof rail part 14 and may be manufactured of the CFRP material.

The plurality of center roof rail parts 15 are disposed to be crossed and may be formed of a net shape or a lattice pattern shape.

Figure 3:
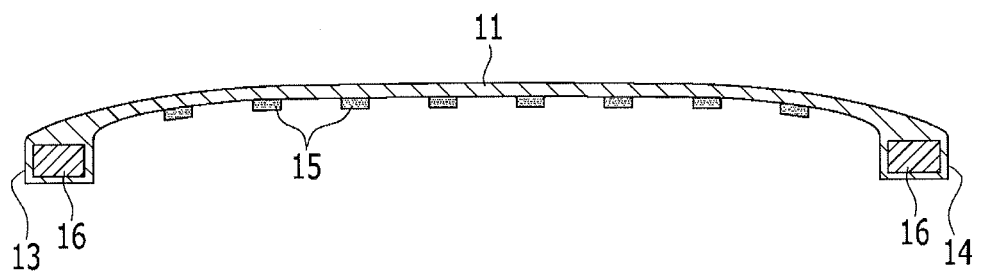
FIG. 3 is a cross-sectional view taken along a line A-A of FIG. 2.

Referring to FIG. 3, a form core 16 may be filled inside the front roof rail part 13 and the rear roof rail part 14.

Also, the plurality of center roof rail parts 15 may be bonded to a lower surface of the roof panel part 11.

Figure 4:
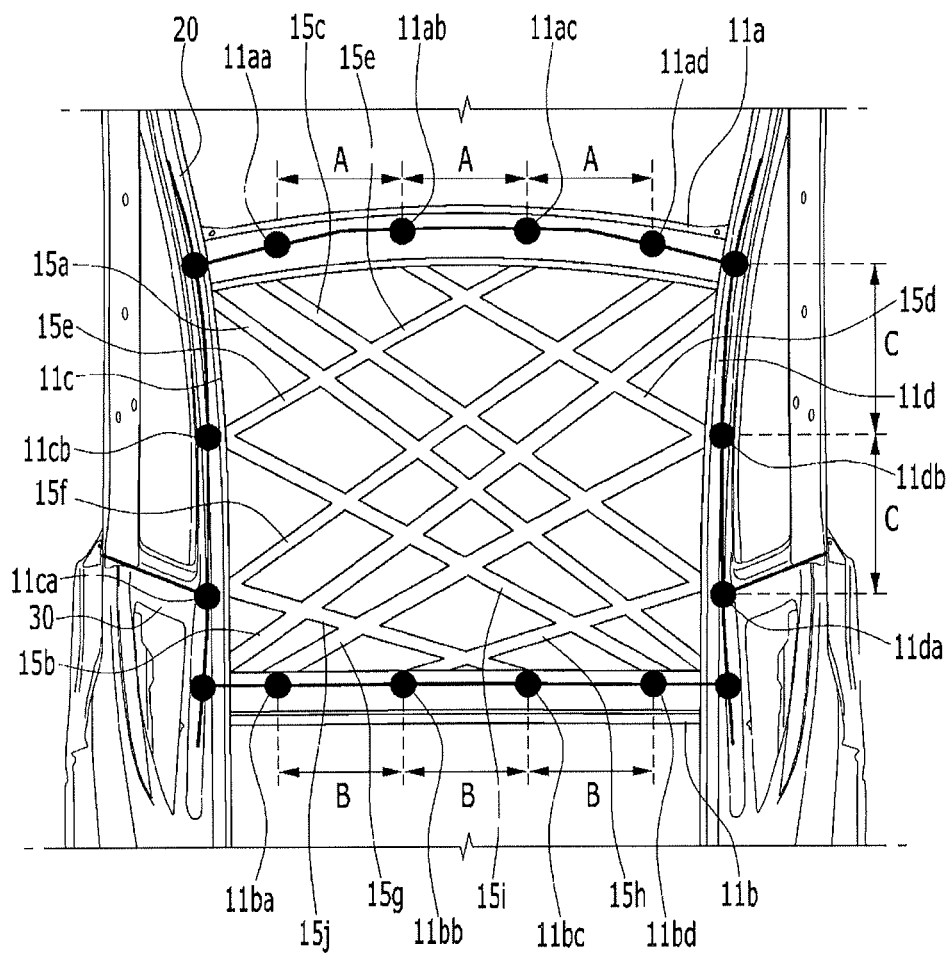
FIG. 4 is a top portion plan view showing a vehicle roof ccoupled to a surrounding vehicle body according to an exemplary embodiment of the present invention.

Referring to FIG. 4, the plurality of center roof rail parts 15 has an arrangement structure optimally reinforcing the stiffness of the roof panel part 11, appropriately and effectively dispersing a load input to the roof panel part 11 from an external source.

That is, in the case that the roof panel part 11 has the substantial square shape and both corner parts of the front side 11a are connected to the front pillar member 20, to reinforce these connection parts, an end portion of the first center roof rail part 15a is connected to a side corner part 11a, and the other end portion of the first center roof rail part 15a is connected to the other side corner part of the rear side 11b of the roof panel part 11.

Also, an end portion of the second center roof rail part 15b is connected to the other side corner part of the front side 11a, and the other end portion thereof is connected to a side corner part of the rear side 11b.

That is, as two first and second center roof rail parts 15a and 15b are disposed to be crossed in the diagonal direction of the roof panel part 11 to connect four corner parts of the roof panel part 11, a longitudinal and a transverse stiffness of the roof panel part 11 increase, and an external load input through the four corner parts may be effectively dispersed.

On the other hand, in the roof panel part 11, because a front side 11a and a rear side 11b, positioned at the front direction and the rear direction along the longitudinal direction of the vehicle, are formed with a window opening downward and has relatively weak stiffness, they are divided into five parts, and because a left side 11c and a right side 11d of the vehicle according to the width direction are supported by a front pillar 20 and a rear pillar 30 and has the larger relatively stiffness than the front side 11a and the rear side 11b, they are divided into three parts.

That is, an interval A between four split points 11aa, 11ab, 11ac, and 11ad of the front side 11a are the same, and the interval B between four split points 11ba, 11bb, 11bc, and 11bd of the rear side 11b are the same.

Also, the left side 11c is divided into a first split point 11ca and a second split point 11cb so that the first split point 11ca is disposed to overlap the rear pillar 30, and the second split point 11cb is positioned on the interval between the first split point 11ca and the left corner part.

A first and second split points 11da and 11db of the right side 11d is divided with the same method as the split points 11ca and 11cb of the left side 11c.

On the other hand, each split point is connected to each other through the plurality of center roof rail parts to increase the stiffness of the roof panel part 11.

That is, the first split point 11aa of the front side 11a and the first split point 11da of the right side 11d are connected by the third center roof rail part 15c, the second split point 11ab of the front side 11a and the second split point 11db of the right side 11d are connected by the fourth center roof rail part 15d, and the third split point 11ab of the front side 11a and the second split point 11cb of the left side 11c are connected by the fifth center roof rail part 15e.

Also, the first split point 11ca of the left side 11c is connected to the fourth split point 11ad of the front side 11a through the sixth center roof rail part 15f, the first split point 11ba of the rear side 11b is connected to the second split point 11db of the right side 11d through the seventh center roof rail part 15g, the second split point 11bb of the rear side 11b is connected to the first split point 11da of the right side 11d through the eight center roof rail part 15h, the fourth split point 11bd of the rear side 11b is connected to the second split point 11cb of the left side 11c through the ninth center roof rail part 15i, and the first split point 11ca of the left side 11c is connected to the third split point 11bc of the rear side 11b through the tenth center roof rail 15j.

On the other hand, in the manufacturing method configured for manufacturing the above-described vehicle roof, a pre-form of the roof panel part 11 is molded using the CFRP material, and the center roof rail parts are reinforced to the pre-form with the lattice pattern shape. in the present case, the center roof rail parts of the CFRP material may be formed of a tape shape to be to the roof panel part or by a dry fiber placement method.

As described above, when the center roof rail parts are disposed to the pre-form of the roof panel part and then are simultaneously hardened, the roof panel part and the center roof rail parts are mutually bonded, being integrated.

Alternatively, the roof panel part and the center roof rail parts may be inserted to a mold and may be integrally formed by applying a heat and a pressure.

For convenience in explanation and accurate definition in the appended claims, the terms "upper", "lower", "internal", "outer", "up", "down", "upwards", "downwards", "front", "back rear", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the claims appended hereto and their equivalents.

What is claimed is:

1. A vehicle roof comprising:
    a roof panel part made of a Carbon Fiber Reinforced Plastics (CFR.P) material; and
    a plurality of center roof rail parts made of the CFRP material and bonded to the roof panel part and to each other in a diagonal direction,
    wherein the plurality of center roof rail parts is disposed to be crossed to each other,
    wherein the plurality of center roof rail parts is bonded to a lower surface of the roof panel part,
    wherein the plurality of center roof rail parts includes:
        a first center roof rail part connecting a front first side corner part of the roof panel part and a rear second side corner part; and
        a second center roof rail part connecting a front second side corner part of the roof panel part and a rear first side corner part,
    wherein the roof panel part includes a front side and a rear side adjacent to a window opening, and a left side and a right side adjacent to a front pillar and a rear pillar,
    wherein each of the front side and the rear side is divided into five parts to which the plurality of center roof rail parts is connected, and
    wherein each of the left side and the right side is divided into three parts to which the plurality of center roof rail parts is connected,
    whereby the plurality of center roof rail parts has an arrangement structure optimally reinforcing a stiffness of the roof panel part, appropriately and effectively dispersing a load input to the roof panel part from an external source.

2. The vehicle roof of claim 1, wherein a front roof rail part and a rear roof rail part are additionally formed at a front edge portion and a rear edge portion of the roof panel part.

3. The vehicle roof of claim 2, wherein a form core built-in to the front roof rail part and the rear roof rail part.

4. The vehicle roof of claim 1, wherein an interval between four split points dividing each of the front side and the rear side into the five parts is a same.

5. The vehicle roof of claim 1, wherein
    each of the front side and the rear side includes a set of first, second, third, fourth split points for being divided into the five parts;
    each of the left side and the right side includes a set of a first split point and a second split point for being divided into the three parts;
    the first split points of the left side and the right side are disposed at a position in which the rear pillar and the left side are crossed and the rear pillar and the right side are crossed; and
    the second split points of the left side and right side are disposed at a position dividing the interval between the first split point of the left side and a first corner part of the roof panel part into two equal parts at the left side and the interval between the first split point of the right side and a second corner part of the roof panel part into two equal parts in the right side.

6. The vehicle roof of claim 5, wherein the plurality of center roof rail parts further includes:
    a third center roof rail part connecting the first split point of the front side and the first split point of the right side;
    a fourth center roof rail part connecting the second split point of the front side and the second split point of the right side;
    a fifth center roof rail part connecting the third split point of the front side and the second split point of the left side;
    a sixth center roof rail part connecting the first split point of the left side and the fourth split point of the front side;
    a seventh center roof rail part connecting the first split point of the rear side and the second split point of the right side;

an eight center roof rail part connecting the second split point of the rear side and the first split point of the right side;
a ninth center roof rail part connecting the fourth split point of the rear side and the second split point of the left side; and
a tenth center roof rail part connecting the first split point of the left side and the third split point of the rear side.

* * * * *